United States Patent [19]

Ohkawa

[11] Patent Number: 4,952,200

[45] Date of Patent: Aug. 28, 1990

[54] AUTOMATIC TRANSMISSION

[75] Inventor: Yuzo Ohkawa, Hiroshima, Japan

[73] Assignee: Mazda Motor Corporation, Hiroshima, Japan

[21] Appl. No.: 184,811

[22] Filed: Apr. 22, 1988

[30] Foreign Application Priority Data

Apr. 28, 1987 [JP] Japan .................. 62-103304
Oct. 30, 1987 [JP] Japan .................. 62-273444

[51] Int. Cl.⁵ .................. F16H 47/08; F16H 57/02
[52] U.S. Cl. .................. 475/47; 74/606 R; 74/730.1; 475/59; 475/72
[58] Field of Search .................. 74/867, 752 C, 752 A, 74/606 R

[56] References Cited

U.S. PATENT DOCUMENTS

| | | | |
|---|---|---|---|
| 4,226,200 | 10/1980 | Morisawa et al. | 74/606 R |
| 4,261,227 | 4/1981 | Yamamori et al. | 74/606 R X |
| 4,333,358 | 6/1982 | Grattapaglia | 74/606 R X |
| 4,364,285 | 12/1982 | Morisawa et al. | 74/606 R |
| 4,499,789 | 2/1985 | Kuramuchi et al. | 74/752 C X |
| 4,682,534 | 7/1987 | Sumiya et al. | 74/606 R X |
| 4,738,152 | 4/1988 | Takimura et al. | 74/606 R X |
| 4,793,213 | 12/1988 | Nishimura et al. | 74/606 R X |
| 4,823,637 | 4/1989 | Taguchi et al. | 74/606 R |

Primary Examiner—Dwight Diehl
Attorney, Agent, or Firm—Wegner & Bretschneider

[57] ABSTRACT

The automatic transmission casing includes a first case portion in which a torque converter is housed, a second case portion in which a transmission gear mechanism is housed being arranged in a series with the first case portion, and a third case portion in which a differential mechanism is housed being disposed extending in a transverse direction against the first and second case portions. The automatic transmission casing is further provided with a partition or wall member being disposed between the first and second case portions and with an reinforcement rib connecting the third case portion to the first or second case portion. Switching or shifting of power transmission pathways of the transmission gear mechanism is effected by operation of hydraulic actuators, and a plurality of accumulators to be used for prevention against a transmission shock are connected to the actuators and arranged separately in the partition member and the reinforcement rib.

18 Claims, 12 Drawing Sheets

AUTOMATIC TRANSMISSION

BACKGROUND OF THE INVENTION

1. Field of the Invention

The present invention relates to an automatic transmission.

2. Description of Related Art

An automatic transmission generally comprises a torque converter and a transmission gear mechanism. The torque converter is accommodated in a converter casing and the transmission gear mechanism is accommodated in a transmission casing, and the converter casing is arranged integrally with the transmission casing. The transmission gear mechanism is usually operated hydraulically, that is, its friction elements for switching power transmission pathways, such as clutches, brakes and so on, are driven by hydraulic actuators.

The transmission gear mechanism is provided with hydraulic circuits for regulating operation of the actuators. The hydraulic circuits are provided with a variety of devices including select valves and shift valves for switching speed ranges, and some devices contain accumulators. If such select valves or shift valves would be coupled at a rapid timing, a so-called select shock or transmission shock is likely to arise so that a hydraulic supply passage for each actuator for driving the friction element is designed to prevent such rapid coupling of the friction element by means of the accumulator.

The oil passages and various devices for the hydraulic circuits are usually mounted in valve bodies and, in these states, mounted in a oil pan of the transmission gear mechanism. If the accumulators are to be mounted integrally in the valve bodies, however, the oil pan and the casing for accommodating the accumulators are rendered proportionally large because the accumulators are considerably bulky and large in number.

In order to solve such problem, Japanese Patent Early Publication (Kokai) No. 211,920/1983 proposes that the accumulators are separated from the valve bodies and arranged in a transmission casing in a series extending parallel to the axis of the transmission gear mechanism. The separation of the accumulators from the valve bodies provides a high freedom of arrangement of the accumulators and permits a compact size of the valve bodies, thus enabling the automatic transmission as a whole to be minimized to a considerable extent.

In the prior art automatic transmission, however, some of the accumulators arranged parallel to the axis of the automatic transmission gear mechanism are to be arranged at a periphery of the transmission gear mechanism, thus expanding in a direction substantially perpendicular to the axis of the automatic transmission.

SUMMARY OF THE INVENTION

Therefore, the present invention has the object to provide an automatic transmission that permits optimization of arrangement of the accumulators and a compact size.

The present invention has been completed on the basis of the fundamental concept that a considerably large dead space formed between the torque converter and the transmission gear mechanism be utilized efficiently and the accumulators are to be disposed therein. In one aspect, the present invention consists essentially of the automatic transmission comprising an automatic transmission casing including a first case portion constituting a converter housing chamber and a second case portion constituting a transmission mechanism housing chamber, the first case portion being arranged integrally with the second case portion; a torque converter being journaled in the converter housing chamber; a transmission gear mechanism adapted to allow its power transmission pathway to be switched or shifted by a plurality of friction coupling elements being journaled in the transmission mechanism housing chamber; and the friction coupling elements each being adapted to be operated by a hydraulic actuator; in which a partition member for defining the converter housing chamber disposed integrally with the first case portion and the transmission mechanism housing chamber disposed integrally with the second case portion is located between the first and second case portions and a plurality of accumulators into which an operating fluid against the respective actuators is introduced are arranged in the partition member along a periphery of the torque converter.

With this arrangement, all the accumulators can be effectively built in a dead space formed between the torque converter and the transmission gear mechanism, thus enabling the automatic transmission to be minimized as a whole to an extremely compact size. In particular, the dead space present along the periphery of the torque converter is so large that it permits accommodation of all or most of the accumulators therein.

Furthermore, as shown much in a FF (front engine front wheel drive) vehicle, there are the growing trend that the automatic transmission is mounted transversely together with the engine body in the vehicle body, that is, that the automatic transmission is arranged such that the axes of its torque converter and transmission gear mechanism extend in a transverse direction of the vehicle body. The automatic transmission of this type is arranged, in increasing cases, such that a differential mechanism housing portion for journaling a differential mechanism is further disposed integrally with the automatic transmission casing. The differential mechanism housing portion is disposed to extend toward the outside in a direction substantially parallel to or along the axis of the transmission gear mechanism. Accordingly, a dead space is formed at the corner portion between the differential mechanism housing portion and the first case portion for housing the torque converter and at the corner portion between the differential mechanism housing portion and the second case portion for housing the transmission gear mechanism. The arrangement of the accumulators at the corner portion permits miniaturization of the automatic transmission. Specifically, in another aspect the present invention consists of the automatic transmission comprising an automatic transmission casing including a first case portion constituting a converter housing chamber and a second case portion constituting a transmission mechanism housing chamber, the first case portion being arranged integrally with the second case portion; a torque converter being journalled in the converter housing chamber; a transmission gear mechanism adapted to allow its power transmission pathway to be switched or shifted by a plurality of friction coupling elements being journalled in the transmission mechanism housing chamber; and the friction coupling elements each being adapted to be operated by a hydraulic actuator; in which the automatic transmission casing further comprises a differential mechanism housing portion for journaling a differential mechanism in a direction extending away toward the outside substantially parallel to the axes of the torque converter and the transmission gear mechanism; and a reinforcement rib being arranged so as to connect the differential mechanism housing chamber to at least either of the first or second case portion; each being disposed integrally with the first and second case portions; and an accumulator to be connected to an operating fluid feed passage against the accumulator is disposed in the reinforcement rib.

If the number of the accumulators becomes too large, they may be mounted in the reinforcement rib in addition to the partition wall portion.

Further advantages and characteristics of the invention will become apparent from the ensuing detailed description of some preferred exemplary embodiments that follow, taken in conjunction with the drawings attached hereto.

DETAILED DESCRIPTION OF THE PREFERRED EMBODIMENTS

Figure 1:
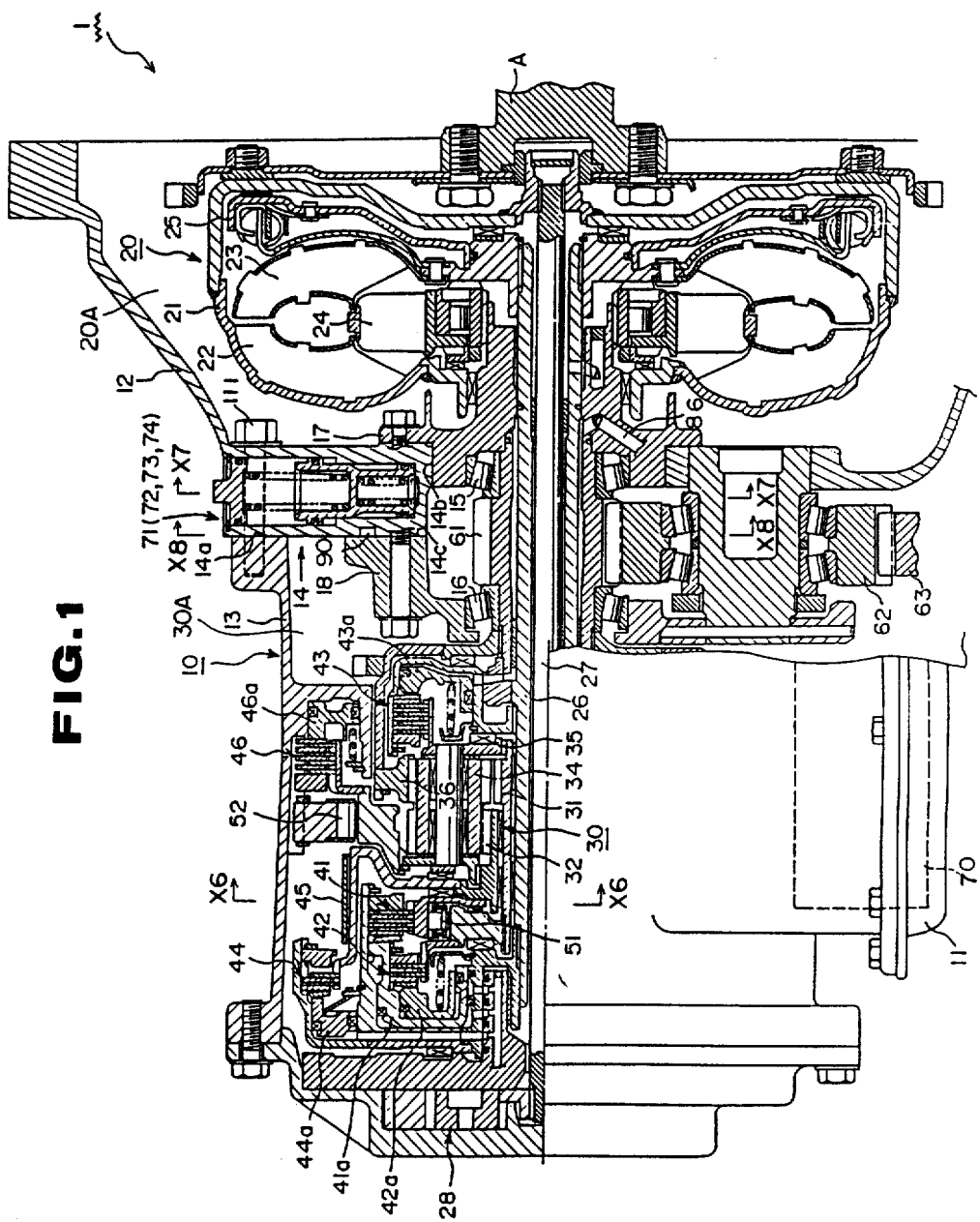
FIG. 1 is a cross sectional side view illustrating one example of a whole construction of an automatic transmission according to the present invention, taken along line X1—X1 of FIG. 3.

The present invention will be described more in detail in conjunction with the drawings.

Basic Structure of Automatic Transmission

A whole structure of the automatic transmission embodying one preferred embodiment according to the present invention will be described with reference to FIGS. 1 and 2.

The automatic transmission 1 is constructed to be adapted for use with a FF (font engine front wheel drive) vehicle. A transmission case 10 comprises essentially a torque converter 20, a transmission gear mechanism 30 to be driven by the output from the torque converter 20, a plurality of friction coupling elements 41 to 46, inclusive, such as friction clutches and friction brakes, for switching or shifting power transmission passages of the transmission gear mechanism 30, and first and second one-way clutches 51 and 52. The automatic transmission has three forward drive ranges "D", "1" and "2" and one rearward drive range "R". The forward drive range "D" provides 1st to 4th speed ranges, inclusive. The first forward drive range "1" provides 1st and 2nd speed ranges, as well of the second forward drive range "2" provides 1st to 3rd speed ranges, inclusive. The automatic transmission 1 is provided integrally with a forward wheel operating apparatus built in a differential mechanism housing portion shown at reference numeral D in FIGS. 3 to 5.

The torque converter 20 in this embodiment includes a pump 22, a turbine 23, a stator 24 and a lock-up clutch 25. The pump 22 is fixedly secured to an inner surface of a transmission enclosure case 21 that is in turn connected securely to an engine output shaft A. The turbine 23 is driven by means of an operating fluid supplied from the pump 22 disposed opposite to the turbine. The stator 24 is interposed between the pump 22 and the turbine 23 in order to amplify a torque. The lock-up clutch 25 is mounted between the transmission enclosure case 21 and the turbine 23 to directly connect the turbine 23 to the engine output shaft A through the transmission enclosure case 21. The torque converter 20 is designed so as to allow a rotation of the turbine 23 to be output to the transmission gear mechanism 30 through a turbine shaft 26. The transmission enclosure case 21 is connected to a pump shaft 27 which inserted rotatably through the turbine shaft 26 to drive an oil pump 28 mounted at a rearward end portion of the automatic transmission.

The transmission gear mechanism 30 includes a planetary gear train. As shown briefly in FIG. 2, the transmission gear mechanism 30 includes a smaller-diameter sun gear 31, a larger-diameter sun gear 32, a plurality of short pinion gears 33, a long pinion gear 34, a gear carrier 35, and a ring gear 36. he smaller-diameter sun gear 31 is engaged freely on the turbine shaft 26 and the larger-diameter sun gear 32 is likewise engaged freely on the turbine shaft 26 rearward of the smaller-diameter sun gear 31. The plural short pinion gears 33 are in mesh with the smaller-diameter sun gear 31. The long pinion gear 34 is in mesh at its forward half portion with the short pinion gears 33 and at its rearward half portion with the larger-diameter sun gear 32. The gear carrier 35 is mounted to rotatably support the short and long pinion gears 33 and 34, respectively. The ring gear 36 is meshed with the forward half portion of the long pinion gear 34.

Between the turbine shaft 26 and the smaller-diameter sun gear 31 are interposed in series a forward clutch 41 and the first one-way clutch 51. Disposed parallel to the clutches 41 and 51 is a coast clutch 42. A 3-4 shift clutch 43 is disposed between the turbine shaft 26 and the gear carrier 35, and a reverse clutch 44 is disposed between the turbine shaft 26 and the larger-diameter sun gear 32. Mounted between the reverse clutch 44 and the larger-diameter sun gear 32 is a 2-4 shift brake 45 consisting of a band brake for fixing the larger-diameter sun gear. The second one-way clutch 52 is arranged parallel to a low-speed reverse brake 46 between the gear carrier 35 and the transmission case 10. The second one-way clutch 52 is to receive the reaction of the gear carrier 35, and the low-speed reverse brake 46 is to fix the gear carrier. The ring gear 36 is connected to an output gear 61, and it transmits the power output to an input gear 63 (FIG. 1) of the forward wheel operating apparatus (not shown) through an intermediate gear 62 from the output gear 61.

Table below indicates the relationship of the drive ranges vs. operating states of the friction clutches 41 to 44 and the friction brakes 45 and 46 as friction coupling elements as well as the one-way clutches 51 and 52.

TABLE

| Speed Ranges | Clutches | | | | Brakes | | One-Way Clutch | |
|---|---|---|---|---|---|---|---|---|
| | Forward (41) | Coast (42) | 3-4 (43) | Reverse (44) | 2-4 (45) | Low-speed Reverse (46) | First (51) | Second (52) |
| P | | | | | | | | |
| R | | | | O | | O | | |
| N | | | | | | | | |
| D 1st Speed | O | | | | | | O | O |
| 2nd Speed | O | | | | O | | O | |
| 3rd Speed | O | O | O | | | | O | |
| 4th Speed | O | | O | | O | | | |
| 2 1st Speed | O | | | | | | O | O |
| 2nd Speed | O | O | | | O | | O | |
| 3rd Speed | O | O | O | | | | O | |
| 1 1st Speed | O | O | | | | O | O | O |
| 2nd Speed | O | O | | | O | | O | |

Note:
The symbol O marks the state of coupling.

As shown in the Table above, during operation of the vehicle in the 1st speed range of the forward drive speed range position "D", the forward clutch 41 is coupled as well as the first one-way clutch 51 and the second one-way clutch 52 are in the coupled conditions capable of transmitting the power output. In the 2nd speed range thereof, the 2-4 brake 45 is coupled in addition to the forward clutch 41 with the first one-way clutch 51 held in the coupled condition and the second one-way clutch 52 released into the uncoupled condition. In the 3rd speed range thereof, the coast clutch 42 and the 3-4 clutch 43 are coupled with the forward clutch 41 and the first one-way clutch 51 held in the coupled condition, while the 2-4 brake 45 is released. In the 4th speed range thereof, the 2-4 brake 45 is coupled again while the forward clutch 41 and the 3-4 clutch 43 are held in the coupled conditions, and the coast clutch 42 and the first one-way clutch 51 are brought in the uncoupled conditions.

In the first speed range in the second forward drive range "3", the forward clutch 41 and the first and second one-way clutches 51 and 52 are brought into the coupled conditions as in the first speed range in the forward drive range "D". In the second range therein, the coast clutch 42 and the 2-4 brake 45 are held in the coupled conditions while the forward clutch 41 and the first one-way clutch 51 are kept in the same conditions as in the first speed range therein and the second one-way clutch 52 is released to the uncoupled condition. In the third speed range therein, the 3-4 clutch 43 is additionally held in the coupled conditions and the 2-4 brake 45 is uncoupled while the rest is kept in the same conditions as in the second speed range therein.

In the first forward drive range "1", the forward clutch 41, the coast clutch 42, the one-way clutches 51 and 52 and the low-speed reverse brake 46 are held in the coupled conditions in the first speed range. In the second speed range therein, the 2-4 brake 45 is additionally held in the coupled condition while the low-speed reverse brake 46 and the second one-way clutch 52 are brought into the uncoupled conditions.

As have been described hereinabove, the first one-way clutch 51 is held in the coupled condition in the 1st, 2nd and 3rd speed ranges in the forward drive speed range position "D" and the second one-way clutch 52 is kept in the coupled condition in the 1st speed range therein: however, they are brought into uncoupled states at the time of coasting so that the engine braking does not work in these speed ranges. The coast clutch 42 parallel to the first one-way clutch 51 is held in the coupled conditions in the 3rd speed range in the forward drive speed range position "D", in the 2nd and 3rd speed ranges in the second forward drive speed range position "2" and in the 1st and 2nd speed ranges in the first forward drive speed range position "1" as well as the low-speed reverse brake 46 parallel to the second one-way clutch is coupled in the 1st speed range in the first forward drive speed range position "1". This arrangement of the clutches and the brakes permits the engine braking at each of the speed ranges as have been described immediately hereinabove.

When the transmission gear shift lever is in the reverse drive gear position "R", the reverse clutch 44 and the low-speed reverse brake 46 are held in the coupled conditions.

Figure 2:
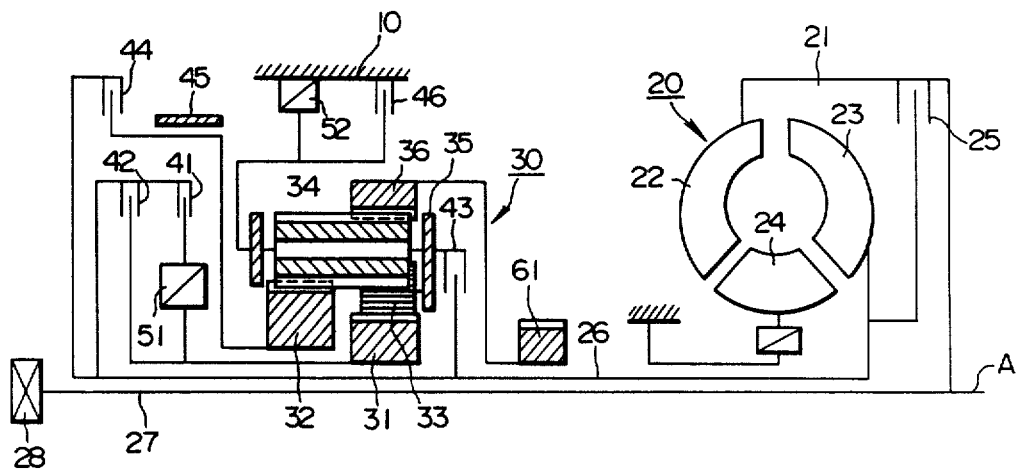
FIG. 2 is a schematic skeleton structural view of FIG. 1.
Figure 6:
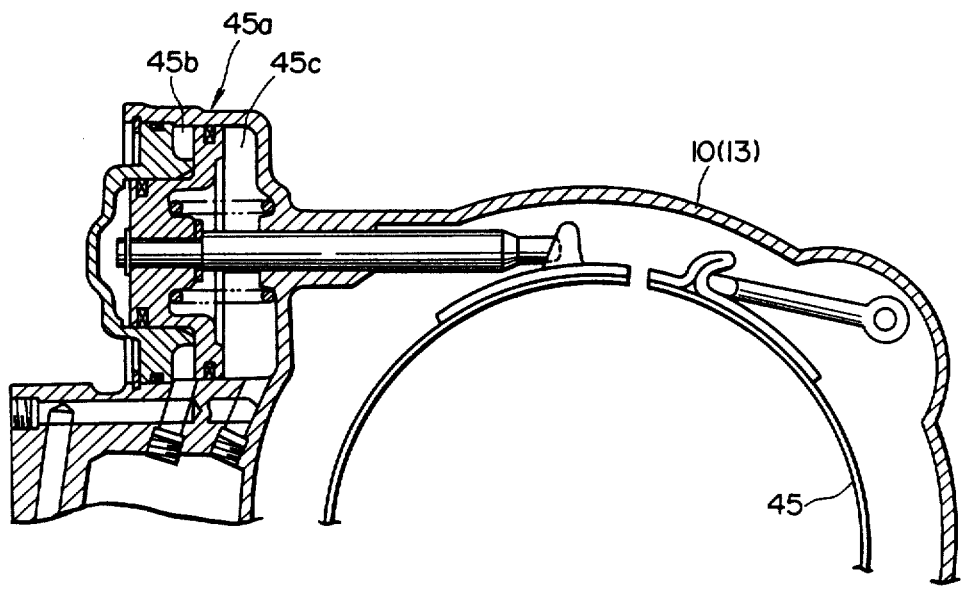
FIG. 6 is a simplified cross sectional view taken along line X6—X6 of FIG. 1, showing a brake band on an actuator for operating the brake band, while omitting other elements for clarification.
Figure 9:
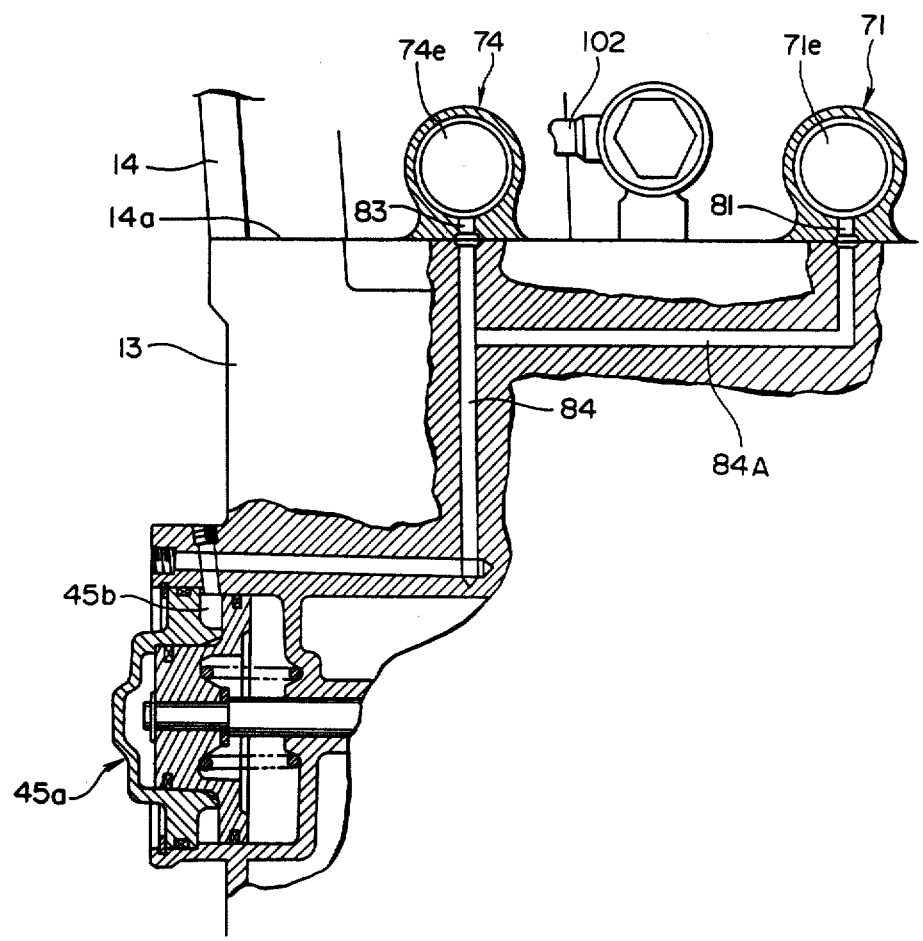
FIG. 9 is a cross sectional view taken along line X9—X9 of FIG. 5.

As shown in FIG. 1, the forward clutch 41, the coast clutch 42, the 3-4 clutch 43, the reverse clutch 44 and the low-speed reverse brake 46 are provided respectively with actuators 41a, 42a, 43a, 44a and 46a each consisting of a hydraulically drivable piston of conventional type. The 2-4 brake 45 is provided with an actuator 45a consisting of a servo piston as shown in FIGS. 6 and 9. Turning back again to FIG. 1, the transmission case 10 is mounted at its bottom portion with an oil pan 11 in which a control valve unit 70 is mounted, thereby controlling the supply or discharge of the hydraulic pressure to and from each of the actuators 41a to 46a to couple or uncouple the friction coupling elements 41 to 46 in the same manner as indicated in the Table above.

It is noted here that the 2-4 brake 45 is designed to be brought in the coupled condition when the hydraulic pressure is supplied to an apply port 45b in the actuator 45a thereof. The 2-4 brake 45 is brought in the uncoupled condition when the hydraulic pressure is supplied to both the apply port 45b and a release port 45c in the actuator 45a thereof or when neither of the apply port 45b nor the release port 45c are supplied with the hydraulic pressure.

Automatic Transmission Case and Accumulators

Referring to FIGS. 1 and 3 to 5, the automatic transmission casing 10 includes a forward casing portion 12 functioning as a first case portion constituting a converter housing chamber and a rearward casing portion 13 functioning as a second case portion constituting a transmission mechanism housing chamber. The forward casing portion 12 is formed at its rearward portion (on the left hand side in FIG. 1) integrally with a partition or wall member 14 extending in a direction perpendicular to the axis of the turbine shaft 26. The forward casing portion 12 is then secured through the partition member 14 to the rearward casing portion 13 by means of bolts 111 so that a forward surface of the rearward casing portion 13 is securedly mounted to a rearward wall surface 14a of the partition member 14. With this arrangement of the automatic transmission casing 10, the torque converter 20 is to be journaled in the forward casing portion 12 functioning as the converter housing chamber 20A forward of the partition member 14 and the transmission gear mechanism 30 is to be housed or accommodated in the rearward casing portion 13 functioning as the transmission mechanism housing chamber 30A rearward thereof. In other words, the partition member 14 divides the converter housing chamber 20A and the transmission mechanism housing chamber 30A. To the forward end surface of the partition member 14, on the one hand, is fixedly secured a forward bearing housing 17 for journaling a first bearing 15 supporting the output gear 61. To the rearward end surface of the partition member 14, on the other hand, is fexed a rearward bearing housing 18 for journaling a second bearing 16 supporting the output gear 61 in cooperation with the second bearing 15.

Figure 3:
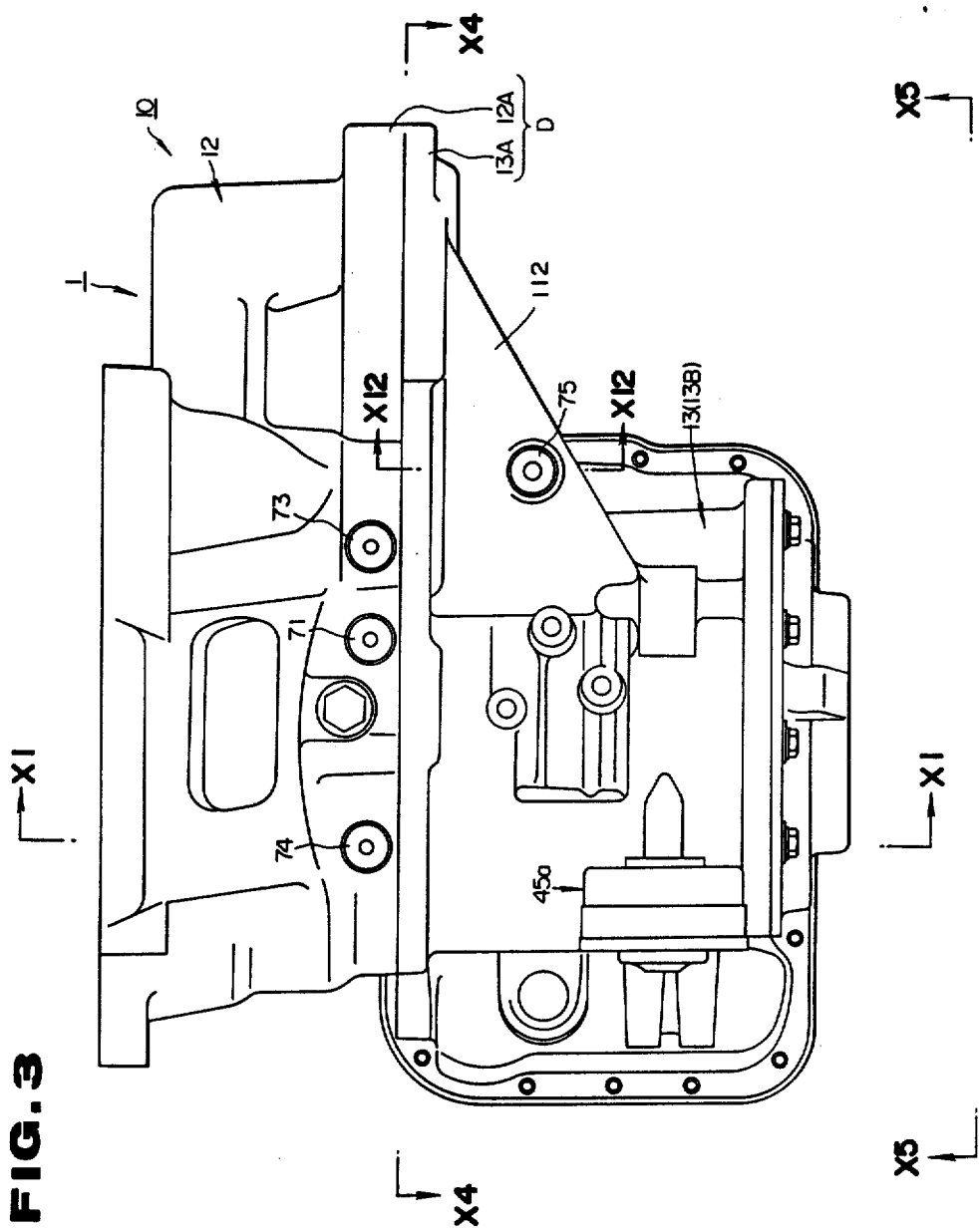
FIG. 3 is a plane view of FIG. 1.
Figure 4:
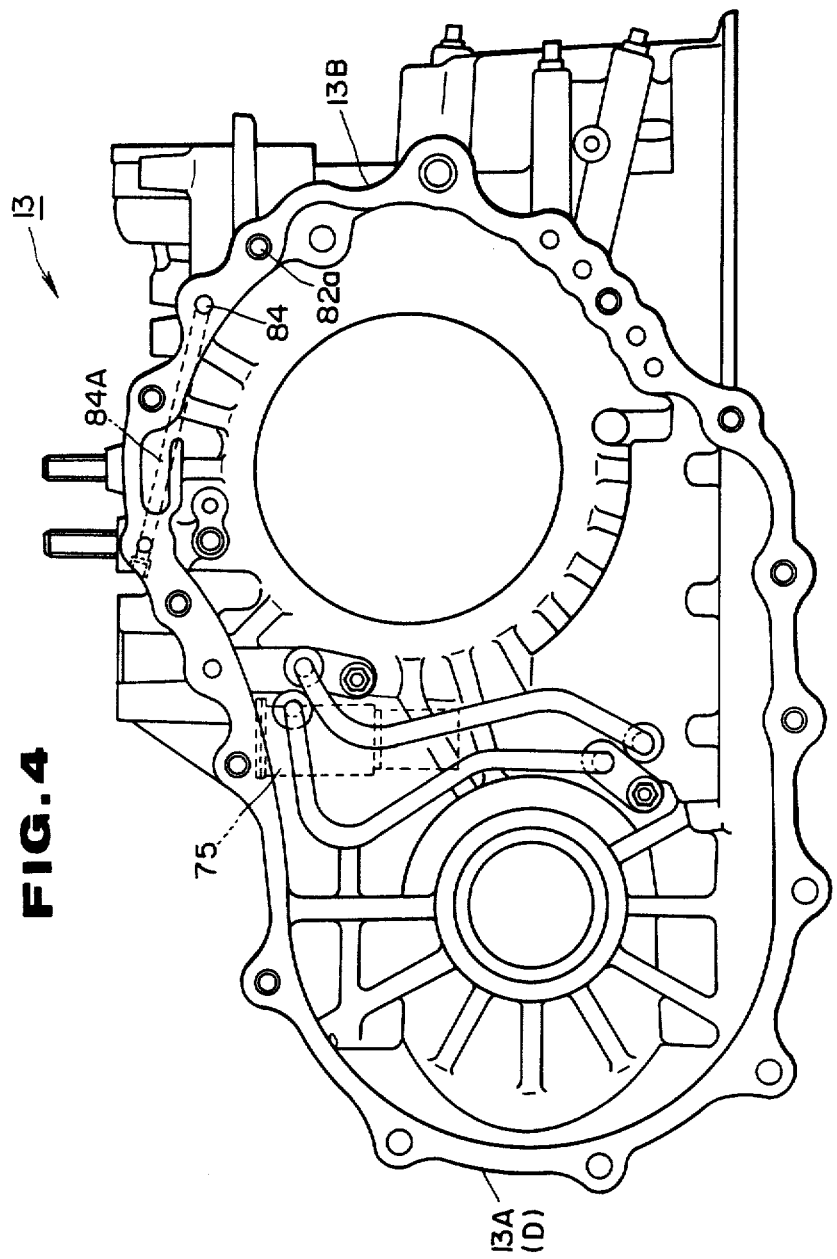
FIG. 4 is a view taken along line X4—X4 of FIG. 3.
Figure 5:
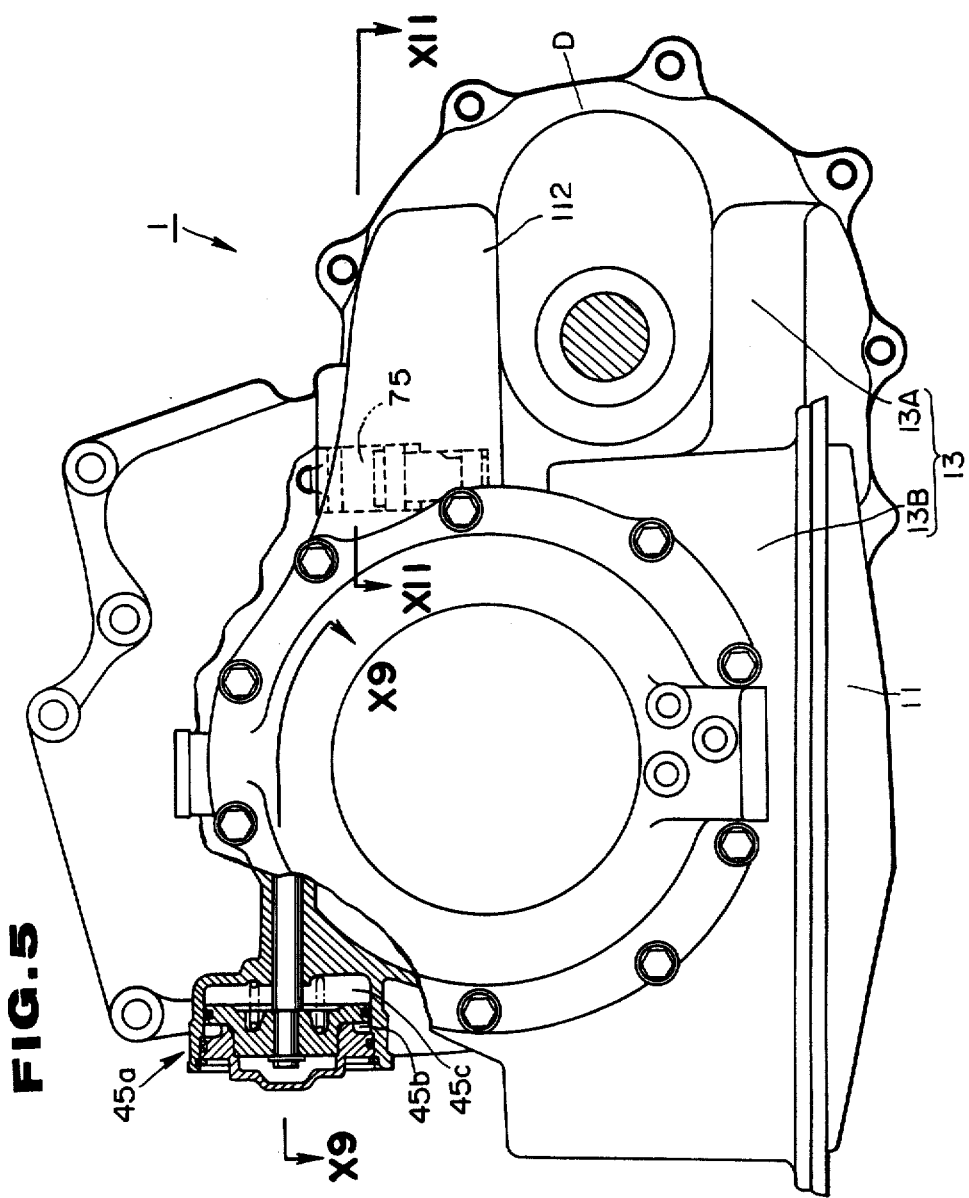
FIG. 5 is a view taken along line X5—X5 of FIG. 3.

As have been described hereinabove, the automatic transmission casing 10 is provided with a third case portion functioning as a differential mechanism housing chamber D for journaling or accommodating a forward wheel differential apparatus and the gears 62 and 63. Referring now to FIGS. 3 to 5, the accommodation chamber D includes a forward accommodation chamber portion 12A and a rearward accommodation chamber portion 13A. The forward accommodation chamber portion 12A is formed integrally with a rearward portion of the forward transmission casing portion 12 and the rearward accommodation chamber portion 13A is formed integrally with a forward portion of the rearward transmission casing portion 13. The respective forward and rearward accommodation chamber portions 12A and 13B are disposed to extend away toward in a direction perpendicular to the axis of the turbine. The rearward accommodation chamber portion 13A is secured to a body portion 13B of the rearward transmission casing portion 13 by means of an reinforcement rib 112 (FIGS. 3, 5 and 11) which in turn is formed integrally with the rearward transmission casing portion.

As have been described hereinabove, the integral formation of the partition member 14 with the forward casing portion 12 provides an open space forward of the rearward casing portion 13 and consequently permits an easy build-in of the transmission gear mechanism in the rearward casing portion 13. It is to be noted herein that the torque converter 20 can be housed or accommodated in the forward casing portion 12 without difficulty because a space forward of the forward casing portion 12 is remained wide open. It is further noted that the turbine shaft 26 extends through the partition member 14 and is rotatably supported thereby.

Figure 7:
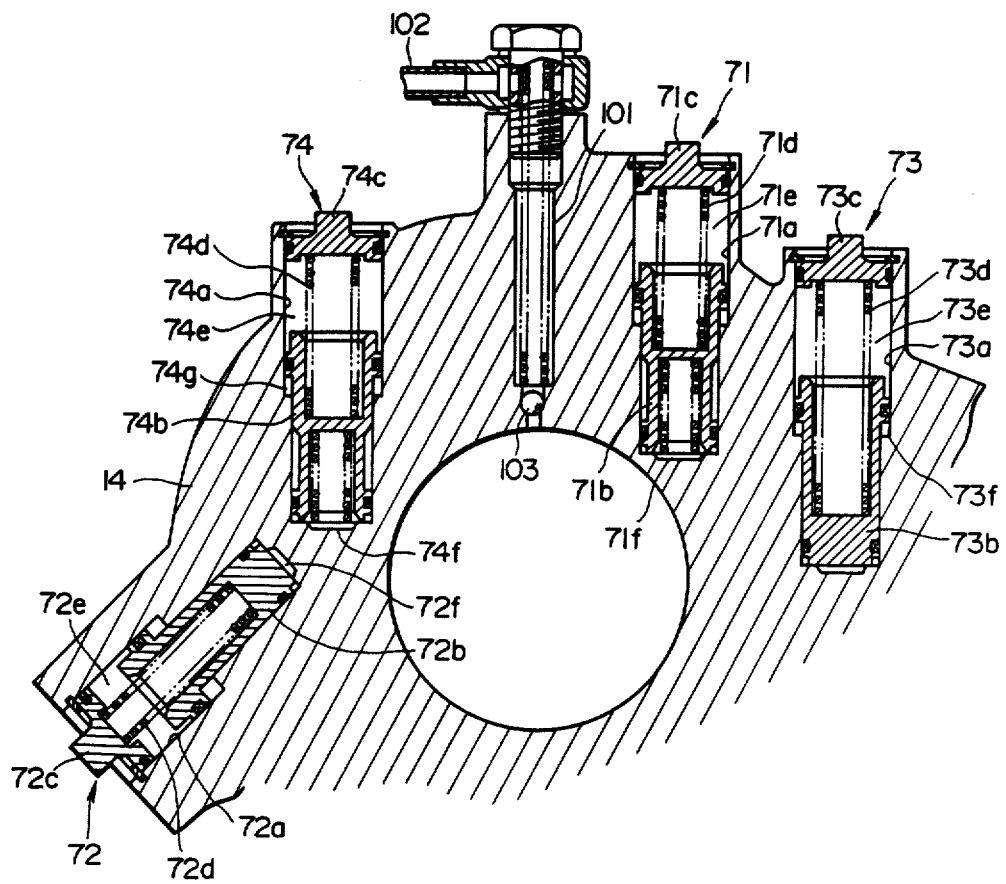
FIG. 7 is a simplified cross sectional view taken along line X7—X7 of FIG. 1, showing accumulators disposed in a partition member, while omitting other elements for clarification.
Figure 8:
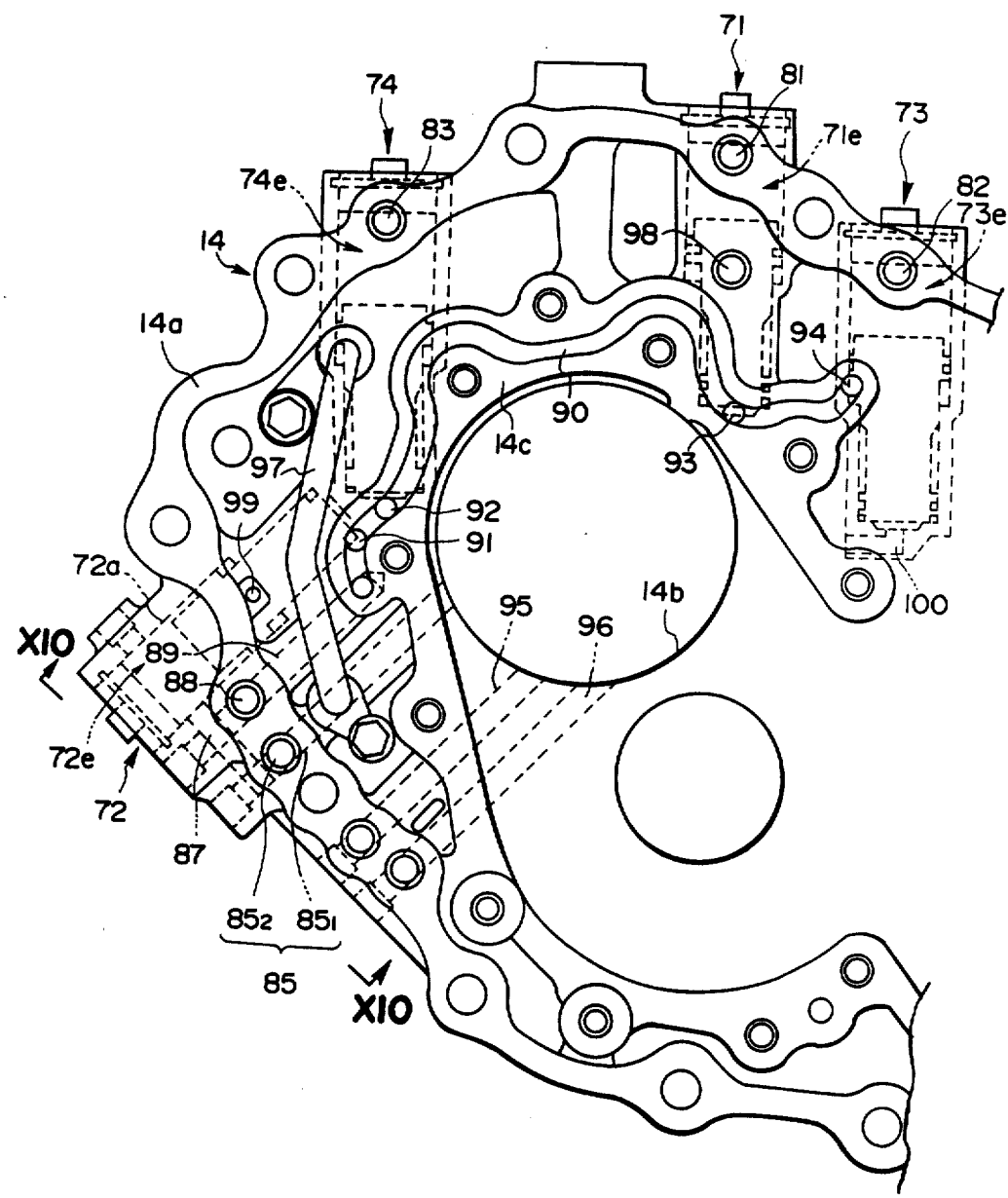
FIG. 8 is a simplified cross sectional view taken along line X8—X8 of FIG. 1, showing oil passages for the accumulators, while omitting other elements for clarification.

Operating fluid is supplied from the control valve unit 70 to the actuator 41a for the forward clutch 41, the actuator 43a for the 3-4 clutch 43, the actuator 44a for the reverse clutch 44 and the actuator 45a for the 2-4 brake 45 through oil passageways which are provided with accumulators in order to reduce shocks caused at the timing of the clutch or brake couplings by adjusting fluid supply timings. In this embodiment, there are provided one accumulator for the neutral and forward drive ranges referred to herein as an N-D accumulator 73, one for the neutral and reverse drive ranges referred to herein as an N-R accumulator 75, one for the 2nd-3rd speed ranges referred to herein as a 2-3 accumulator 72, and two for the 1st-2nd speed ranges referred to herein as a first 1-2 accumulator 71 and a second 1-2 accumulator 74, respectively. The N-R accumulator 75 is mounted in the reinforcement rib 112 formed in the rearward transmission casing portion 13 as shown in FIGS. 3 and 5, while the remainder of the accumulators are disposed in the partition member 14 as shown in FIGS. 1, 7 and 8. The reason for the disposition of the two 1-2 accumulators 71 and 74 is because a large degree of a transmission shock occurs at the shifting between the 1st speed range and the 2nd speed range so that only one accumulator is not enough to absorb a sufficient degree of shock.

The arrangement and disposition of the accumulators 71 to 74 on the partition member 14 will then be described with reference to FIG. 7. These accumulators 71 to 74, inclusive, are constructed, respectively, such that cylinder bores or cavities 71a to 74a are formed inwardly in the outer peripheral surface of the partition member 14, that is, an outward surface in the radial direction of the turbine shaft 26, spools 71b to 74b are inserted therein, and caps 71c to 74c are mounted to close the the openings of the cylinder bores 71a to 74a. Between the spools 71b to 74b and the caps 71c to 74c are provided springs 71d to 74d, respectively, in such a manner as urging the spools 71b to 74b toward the bottoms of the cylinder bores 71a to 74a, and the respective spaces in which the springs 71d to 74d are mounted are used for and function as pressure accumulating chambers 71e to 74e. The first and second 1-2 accumulators 71 and 74, respectively, and the N-D accumulator 73 are disposed on the upper portion of the partition member 14 vertically and substantially parallel to each other, while the 2-3 accumulator 72 is disposed on a side portion thereof in the oblique direction. As have been described hereinabove, the substantially parallel arrangement of the cylinder bores permits an easy withdrawal of a core upon casting and subsequent mechanical processing.

Figure 11:
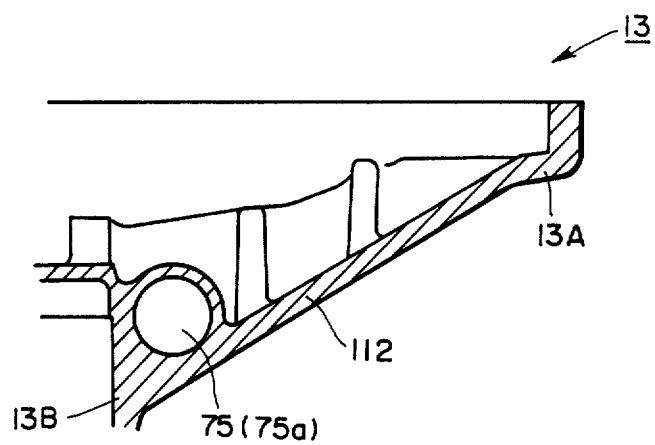
FIG. 11 is a cross sectional view taken along line X11—X11 of FIG. 5.

Turning now to FIGS. 5 and 11, the N-R accumulator 75 is of substantially the same construction as the accumulators 71 to 74 and is disposed vertically in the reinforcement rib 112.

It is to be noted that the substantially vertical disposition of the cylinder bores 71a to 75a permits an easy maintenance and inspection on the accumulators 71, 73 to 75 upon loading on the vehicle body.

Construction of Fluid Passageways against Accumulators 71-74:

The accumulators 71 to 75 having the constructions as have been described immediately hereinabove are supplied with operating oil pressures and line pressures for the friction coupling members.

As shown in FIG. 8, the pressure accumulating chamber 73e of the N-D accumulator 73 is communicated with an oil pressure passage 82 having an opening on the mounting surface 14a of the partition member 14 on which the rearward casing portion 13 is mounted. To the oil pressure passage 82 is connected to a branch passage 82a (FIG. 4) branched in the rearward casing portion 13 from the operating fluid supply passageway extending to the actuator 41a for the forward clutch 41 from the control valve unit 70.

As shown specifically in FIG. 9, the first 1-2 accumulator 71 is provided with an oil pressure supply passage 81 communicating with the pressure accumulating chamber 71e and having an opening on the mounting surface 14a of the partition member 14 to which the rearward transmission casing portion 13 is mounted. The oil pressure supply passage 81 is connected at one opening end to an oil passage 84A which in turn is branched into an oil passage 84 extending through the rearward transmission casing portion 13 to an apply port 45b of the actuator 45a for the 2-4 brake 45 as shown specifically in FIG. 8. The second 1-2 accumulator 74 is likewise provided with an oil pressure supply passage 83 which in turn in communicated with the pressure accumulating chamber 74e and has an opening on the mounting surface 14a of the partition member 14. The oil passage 83 is communicated with the oil passage 84. As have been described hereinabove, such an arrangement of the passages omits a provision of pipes when the forward casing portion 12 is integrally connected to the rearward casing portion 13.

Figure 10:
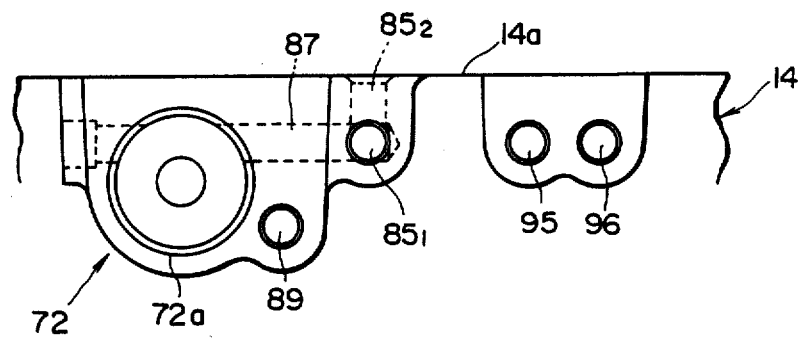
FIG. 10 is a cross sectional view taken along line X10—X10 of FIG. 8.

Referring now to FIGS. 8 and 10, the 2-3 accumulator 72 is disposed on one side of the partition member 14 so as to extend inwardly at an inclination, and an oil pressure is fed to the pressure accumulating chamber 72e of the 2-3 accumulator 72 through a passage in the partition member 14 from an operating oil supply passage 85 through which the operating oil is controllably supplied to the actuator 43a for the 3-4 clutch 43 by means of the 2-3 accumulator 72. As shown specifically in FIG. 8, the operating oil supply passage 85 is disposed in the partition member 14 and includes a first oil supply passage $85_1$ and a second oil supply passage $85_2$. The first oil supply passage $85_1$ is disposed to provide an opening between the outer peripheral surface of the partition member 14 and the inner peripheral surface of an engaging bore 14b with which a forward bearing housing 17 is engaged. The second oil supply passage $85_2$ is intersected with the first oil supply passage $85_1$ and has an opening on the mounting surface 14a of the partition member 14 to which the rearward transmission casing portion 13 is mounted. The first oil supply passage $85_1$ is communicated at one end of its opening against the engaging bore 14b with the control valve unit 70 through the passage 86 (FIG. 1) formed in the forward bearing housing 17 engaged with the engaging bore 14b. The second oil supply passage $85_2$ is connected at one end of its opening against the mounting surface 14a to a passage (not shown) disposed in the rearward casing portion 13 through which the second oil supply passage $85_2$ in turn is connected to the actuator 43a for the 3-4 clutch 43. Turning now to FIGS. 7, 8 and 10, a mounting hole 72a in which the 2-3 accumulator 72 is to be mounted is provided on the outer peripheral surface of the partition member 14 at a position close to the first passage $85_1$ and in a direction parallel thereto. And an oil pressure supply passage 87 is disposed in the partition member 14 so as to intersect the mounting hole 72a and the first oil supply passage $85_1$, thus enabling the oil pressure to be fed form the operating oil supplying passage 85 for the 3-4 clutch 43 to the pressure accumulating chamber 72e of the 2-3 accumulator 72.

Line pressures may be supplied to the accumulators 71 to 74 in such a manner as will be described in conjunction with the drawings. A line pressure supply hole 88 is provided nearby the 2-3 accumulator 72 on the rear wall end surface 14a of the rearward transmission casing portion 13, which acts as an inlet of the line pressure from the side of the rearward casing portion 13. The line pressure supply hole 88 is communicated with an oil groove 90 through a passage 89 formed in the partition member 14, and is in a wavy shape on a mounting surface 14c of the partition member to which a rearward bearing housing 18 is to be mounted. The oil groove 90 is provided thereon about the axis of the torque converter 20 and closed by the rearward bearing housing 18 mounted thereon, thus providing an oil pressure passage for the line pressure as shown in FIG. 1. The oil groove 90 is provided in the order from its upstream side to its downstream side with holes 91 to 94, inclusive, which are respectively communicated with a line pressure port 72f of the 2-3 accumulator 72, a line pressure port 74f of the second 1-2 accumulator 74, a line pressure port 71f of the first 1-2 accumulator 71, and a line pressure port 73f of the N-D accumulator 73, thus allowing the line pressure to be fed to the respective accumulators as a back pressure. The oil groove 90 may also be used as a line pressure supply passage which supplies the line pressure to the accumulators 71 to 74, inclusive. It is advantageous that such a groove shape permits a ready formation of the line pressure supply passage upon casting of the forward casing portion 12.

The passage 89 which acts as an oil passage for feeding the line pressure is bored in one side portion of the partition member 14 parallel to the mounting hole 72a for mounting of the 2-3 accumulator and to the first passage $85_1$ constituting the operating oil supply passage for the 3-4 clutch 43. Disposed parallel to those holes on the partition member 14 are on oil pressure passage 95 for coupling the lock-up clutch 25 of the torque converter 20 and an oil pressure passage 96 for releasing it. The parallel alignment of the mounting hole 72a with the oil passages 85, 87, 95 and 96 permits ready derusting when these holes are formed together with the casting of the forward transmission casing portion 12 and subsequent machine processing with ease in the same direction.

As shown in FIG. 8, the first operating oil supply passage $85_1$ for the 3-4 clutch 43 is further connected to an adjusting port 74g for the 1-2 accumulator 74 (FIG. 7) through a pipe 97, thereby permitting the oil pressure to be fed to the 1-2 clutch 74 so as to couple the 3-4 clutch for shock tuning. It is noted herein that, although the shock tuning is effected only on the accumulator 74 in this embodiment, it may also be likewise effected on the accumulator 71 by connecting the first oil pressure supply passage $85_1$ through a pipe to an adjusting port to which a passage 98 is connected.

The 2-3 accumulator 72 and the N-D accumulator 73 are provided, respectively, with drain passages 99 and 100 in the partition member 14.

Turning to FIG. 7, operating oil passages 101 and 102 are disposed to feed the operating oil in the torque converter 20 to an oil cooler (not shown). The oil passage 101 is mounted with an auxiliary compression valve 103 to maintain the oil pressure in the torque converter at a predetermined value.

Construction of Oil Passage for Accumulator 75

Figure 12:
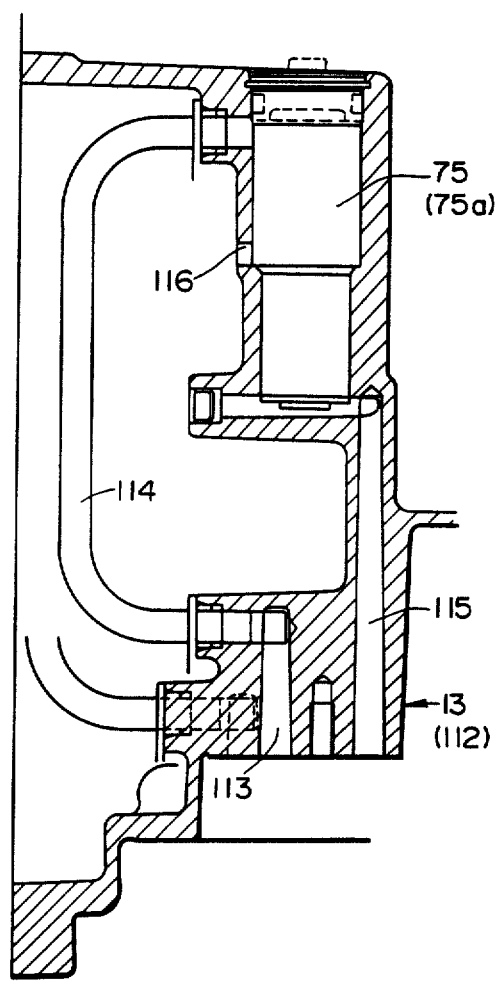
FIG. 12 is a cross sectional view taken along line X12—X12 of FIG. 3.

The N-R accumulator 75 is of substantially the same construction as the other accumulators 71 to 74 as have been described hereinabove. Referring to FIGS. 11 and 12, the operating oil pressure is fed from the actuator 43a for the reverse clutch 44 to the cylinder bore 75a for mounting the N-R accumulator 75 through an oil passage 113 disposed in the rearward transmission casing portion 13 and a pipe 114 communicating the oil passage 113 with the cylinder bore 75a in which the N-R accumulator is disposed. The line pressure is fed as a back pressure to the N-R accumulator 75 through an oil passage 115 disposed in the rearward transmission casing portion 13. A drain port of the accumulator 75 is referred to by numeral 116.

Figure 13:
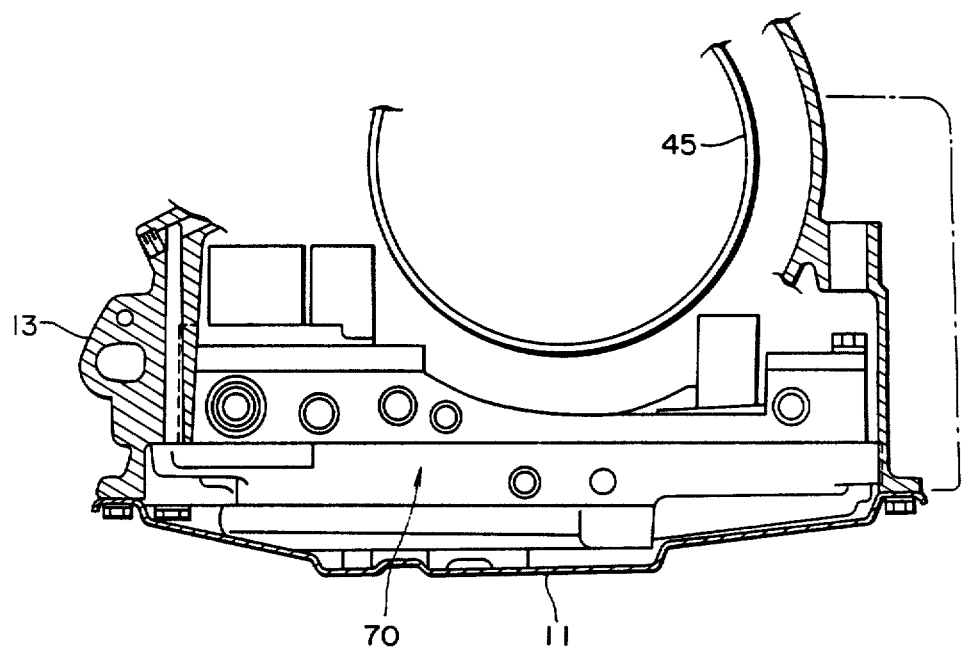
FIG. 13 is a cross sectional view in the axial direction of the automatic transmission illustrating a valve unit journaled in an oil pan.

The arrangement for the accumulators 71 to 75 in such a manner as have been described herein permits a compact construction of an automatic transmission because they have been otherwise disposed conventionally in a valve body. If the accumulators 71 to 75 would be arranged in series in the axial direction of a transmission geartrain, the rearward transmission casing portion 13 will be expanded toward outside its side portion as shown by the point-dash lines in FIG. 13.

It is to be noted herein that the construction of the automatic transmission according to the present invention can be likewise applied to an automatic transmission of the type that an output of a transmission gear mechanism 30 is transmitted from the side opposite to the torque converter as seen in FR (front engine rear wheel drive) vehicles in which no output gear 61 is interposed between the torque converter 20 and the transmission gear mechanism 30.

It is to be understood that the foregoing text and drawings relate to embodiments of the present invention given by way of examples but not limitation. Various other embodiments and variants are possible within the spirit and scope of the present invention.

What is claimed is:

1. An automatic transmission comprising an automatic transmission casing including a first case portion constituting a converter housing chamber and a second case portion constituting a transmission mechanism housing chamber, the first case portion being arranged integrally with the second case portion; a torque converter being journaled in said converter housing chamber; and a transmission gear mechanism journaled in said transmission mechanism housing chamber for switching a power transmission pathway, or shifting speed stages, a by plurality of friction coupling elements, each of the friction coupling elements being operable by a hydraulic actuator; wherein
said transmission casing is further provided with a partition member for defining said converter housing chamber and said transmission mechanism housing chamber, said partition member being integral with said first and second case portions; and
a plurality of accumulators through which operating fluid is fed to the respective actuators are arranged in said partition member along a peripheral direction of the torque converter.

2. An automatic transmission as claimed in claim 1, wherein said partition member is located substantially perpendicular to the longitudinal axis of said torque converter and the longitudinal axis of said transmission gear mechanism; and
wherein said accumulators each comprise a cylinder bore formed in said partition member and a spool mounted slidably in the cylinder bore defining a pressure accumulating chamber into which fluid pressure is supplied.

3. An automatic transmission as claimed in claim 2, wherein said partition member is provided with at least two out of the accumulators in such a manner that a direction in which the spool of one accumulator slides is parallel to a direction in which the spool of the other accumulator slides.

4. An automatic transmission as claimed in claim 2, wherein a hole extends so as to pass through said partition member from an inner peripheral surface thereof to an exterior peripheral surface thereof in a direction substantially perpendicular to said axes;
said hole is disposed to function as a fluid passage for the automatic transmission; and
at least one of the accumulators is arranged parallel to said opening.

5. An automatic transmission as claimed in claim 2, wherein said cylinder bore has an opening against the exterior peripheral surface of said partition member.

6. An automatic transmission as claimed in claim 5, wherein said opening is closed by a cap member, and said cap member defines the pressure accumulating chamber in cooperation with the spool mounted in said cylinder bore.

7. An automatic transmission as claimed in claim 1, wherein said automatic transmission casing is further provided with a differential mechanism housing case portion and an enforcement rib, said differential mechanism housing case portion being for journaling a differential mechanism therein, said case portion projecting outwardly in a direction extending substantially perpendicularly to the longitudinal axes of the torque converter and the transmission gear mechanism and said enforcement rib connecting said differential mechanism housing case portion to first or second case portion; and
at least one accumulator is disposed in said enforcement rib.

8. An automatic transmission as claimed in claim 7, wherein the automatic transmission is arranged such that the axes of the torque converter and the transmission gear mechanism extend in a transverse direction of a vehicle body.

9. An automatic transmission as claimed in claim 7, wherein said differential mechanism housing case portion is disposed nearby at a boundary area between the first case portion and the second case portion.

10. An automatic transmission as claimed in claim 1, wherein said partition member is disposed so as to rotatably support a turbine shaft rotating integrally with a turbine of said torque converter in a state of being inserted through said partition member and functioning as an input shaft of said transmission gear mechanism.

11. An automatic transmission as claimed in claim 10, wherein an output shaft of said transmission gear mechanism is arranged so as to rotatably abut with an exterior periphery of said turbine shaft and to be rotatably supported by said partition member.

12. An automatic transmission as claimed in claim 11, wherein the accumulator includes a cylinder bore formed in said partition member and a spool being slidably inserted therein for defining a first chamber portion and a second chamber portion;

said first chamber portion is disposed so as to function as a pressure accumulating chamber into which an operating fluid is fed;

said second chamber portion is disposed so as to function as a line pressure chamber into which a line pressure is fed;

a portion of a line pressure feed passage communicating with said line pressure chamber comprises a groove formed on an end surface of said partition member and a bearing housing fixedly secured to said partition member so as to close said groove; and said turbine shaft is rotatably supported by said partition member through said bearing housing.

13. An automatic transmission comprising an automatic transmission casing including a first case portion constituting a converter housing chamber and a second case portion constituting a transmission mechanism housing chamber, wherein said first case and second case portions are arranged separately; and a torque converter journaled in said converter housing chamber; a transmission gear mechanism journaled in said transmission mechanism housing chamber for switching a power transmission pathway, or shifting speed stages, by a plurality of friction coupling elements; and each of the friction coupling elements being operable by a hydraulic actuator; wherein said transmission casing is further provided with a partition member for defining said converter housing chamber and said transmission mechanism housing chamber, and first case portion is integral with said partition member; and a plurality of accumulators through which operating fluid is fed to the respective actuators are arranged in said partition member along a peripheral direction of the torque converter.

14. An automatic transmission as claimed in claim 13, wherein said accumulators each comprise a cylinder bore formed in said partition member and a spool mounted slidably in the cylinder bore defining a pressure accumulating chamber into which operating fluid is supplied;

a first passage and a second passage are provided, respectively, in the first case portion and second case portion for feeding the operating fluid to the pressure accumulating chamber; and said first passage is communicated with said second passage at a surface on which said first case portion abuts with said second case portion.

15. An automatic transmission as claimed in claim 13, wherein a hole extends so as to pass through said partition member from an inner peripheral surface thereof to an exterior peripheral surface thereof in a direction substantially perpendicular to said axes;

said accumulators each comprises a cylinder bore formed in said partition member and a spool mounted slidably in the cylinder bore defining a pressure accumulating chamber into which operating fluid is supplied; and said hole is arranged so as to allow the operating fluid to be fed to the pressure accumulating chamber.

16. An automatic transmission as claimed in claim 13, wherein said accumulators each comprises a cylinder bore formed in said partition member and a spool mounted slidably in the cylinder bore defining a pressure accumulating chamber into which operating fluid is supplied; and said cylinder bore is provided therein with a line pressure chamber to which a line pressure is fed, said line pressure chamber being divided from the pressure accumulating chamber by means of the spool.

17. An automatic transmission as claimed in claim 16, wherein a groove is provided on an end surface of said partition member, said groove functioning as a line pressure passage through which a line pressure is fed to said line pressure chamber.

18. An automatic transmission comprising an automatic transmission casing including a first case portion constituting a converter housing chamber and a second case portion constituting a transmission mechanism housing chamber, the first case portion being arranged integrally with the second case portion; a torque converter being journaled in said converter housing chamber; a transmission gear mechanism journaled in said transmission mechanism housing chamber for switching a power transmission pathway, or shifting speed stages, by a plurality of friction coupling elements; and each of the friction coupling elements being operably by a hydraulic actuator; wherein said automatic transmission casing further comprises a partition member, a differential mechanism housing portion, and an enforcement rib, each of which is integral with said first and second case portions; said partition member being for defining said converter housing chamber and said transmission mechanism housing chamber; said differential mechanism housing portion being for journaling a differential mechanism, said differential mechanism housing portion being projecting outwardly in a direction extending substantially perpendicular to the longitudinal axis of said torque converter and the longitudinal axis of said transmission mechanism; and said enforcement rib being arranged so as to connect said differential mechanism housing portion to at least either the first or second case portion; and a plurality of accumulators to be connected to an operating fluid feed passage through which operating fluid is fed to their respective accumulators are disposed in said partition member and said enforcement rib.

* * * * *